United States Patent
Cafferty et al.

(10) Patent No.: US 6,826,058 B1
(45) Date of Patent: Nov. 30, 2004

(54) TELECOMMUNICATIONS PANEL FLAME SHIELD AND WIRE TROUGH

(75) Inventors: Gerard M. Cafferty, Richardson, TX (US); Mark Spaulding, Wylie, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/633,421

(22) Filed: Aug. 4, 2003

(51) Int. Cl.[7] .................................................. H02B 1/01

(52) U.S. Cl. ........................ 361/825; 361/818; 361/816; 361/800; 174/35 R; 174/51

(58) Field of Search ................................ 361/818, 816, 361/800, 752, 797, 748, 826; 174/35 R, 51

(56) References Cited

U.S. PATENT DOCUMENTS

| | | | |
|---|---|---|---|
| 6,477,055 B1 | * | 11/2002 | Bolognia et al. ........... 361/724 |
| 6,481,582 B1 | * | 11/2002 | Rinderer ...................... 211/26 |
| 6,587,354 B1 | * | 7/2003 | Kutsch et al. .............. 361/788 |
| 6,646,867 B1 | * | 11/2003 | Tuttle et al. ................ 361/683 |

OTHER PUBLICATIONS

–Fritz et al., Telecommunications chassis and card, Pub No. US 2002/0118526A1, Pub date. Aug. 29, 2002. –Shirakami et al., Housing structure for ultrafast communication apparatus, Pub No. US 2003/0214798 A1, Pub date. Nov. 20, 2003.*

–Varghese et al., Modular AC input section for a power supply unit, Pub No. US 2003/0058613A1, Pub date. Mar. 27, 2003.*

* cited by examiner

*Primary Examiner*—David Martin
*Assistant Examiner*—Hung S. Bui
(74) *Attorney, Agent, or Firm*—Birch, Stewart, Kolasch & Birch, LLP

(57) ABSTRACT

A flame shield is provided which redirects heat and flame away from an undersurface of a housing of electrical equipment, such as a digital cross connect (DSX) panel installed in a rack system in a wiring closet or central office. The flame shield has a conforming shape to a lower surface of the DSX panel. The flame shield includes tabs with mounting holes, which permit the same fasteners used to initially attach the DSX panel to the rails of the rail system to be reused in attaching the flame shield and DSX panel combination to the rails of the rack system. Also, the flame shield includes an extended portion having a v-shaped cross section, which serves to shield wiring entering the DSX panel from heat and flame and also acts as a wiring guide.

20 Claims, 6 Drawing Sheets

TELECOMMUNICATIONS PANEL FLAME SHIELD AND WIRE TROUGH

BACKGROUND OF THE INVENTION

1. Field of the Invention

The present invention relates to flame and heat shields. More particularly, the present invention relates to a flame and heat shield, which protects a housing and/or equipment employed on a rack-mounted electronics assembly.

2. Description of the Background Art

A rack-mounted electronics assembly is often employed in a central office equipment room or wiring closet. In the wiring closet, interconnections for telephone and network services are established. In other words, perhaps hundreds or thousands of twisted pairs, coaxial cables, fiber optic lines, etc. are selectively interconnected via various equipment.

FIG. 1 illustrates a front view of a rack system 10 in a typical wiring closet and FIG. 2 illustrates a rear view the rack system 10 in the wiring closet. As illustrated in FIGS. 1 and 2, a plurality of digital cross connect (DSX) panels 5 are attached to a first rail 7 and a second rail 8 constituting the rails of the rack system 10. Further, a power supply 4 is attached to the first and second rails 7, 8, below a lowermost DSX panel 5'. Building wiring 12, which is connected to various equipment throughout the building, e.g. jacks, computers, printers, facsimile machines, telephones, etc., enters and exits the rack system 10 from overhead. The building wiring 12 enters and exits the backs of respective DSX panels 5 and is connected therein to terminals, e.g. wire wrap terminals, insulation displacement connectors (IDC's). The fronts of the D$X panels 5 include a plurality of jacks and/or jumpers, so that a technician can make organized interconnections between the building wiring 12.

FIG. 3 is a close-up view illustrating a rear perspective of the lowermost DSX panel 5' attached to the first and second rails 7, 8. The building wiring 12 has been removed to simplify the illustration. However, it should be noted that the building wiring 12 would enter and exit the lowermost DSX panel 5' via portals 13. The lowermost DSX panel 5' includes a first side wall 14, an opposite second side wall 15, a bottom surface 16 and a rear surface 17. The rear surface 17 includes the portals 13. Further, the DSX panel 5' is attached to the rack system 10 by bolts or nuts 2 or similar fasteners, which pass through placement holes 3 formed in the first and second rails 7, 8 and through mounting holes 18 formed in side tabs 19 of the DSX panel 5' (See FIG. 5).

Occasionally, a!fire will occur in one of the components mounted on the rack system 10. Fires are usually not started by a component part of the DSX panel 5, since the wiring and interconnections therein are mostly passive. Most often, the fire is associated with a defective or failed component of the power supply 4, such as a transistor, capacitor, or transformer. In accordance with the background art, a fire in the power supply 4 has occasion to destroy not only the component parts of the power supply, but also to destroy or damage one or more DSX panels 5. The lowermost DSX panel 5' is most susceptible due to its immediate proximity to the power supply 4 and the fact that heat and flame will rise, and the fact that the DSX panels are typically manufactured of plastic.

SUMMARY OF THE PRESENT INVENTION

It is an object of the present invention to address one or more of the drawbacks associated with the background art.

It is an object of the present invention to provide a structure to limit the damage to the components mounted on a rack system.

It is an object of the present invention to provide a structure to shield one or more of the components of the rack system from heat and/or fire.

It is object of the present invention to provide a structure to guide wires and cables and hence simply the layout of wires and cabling, to improve the appearance of the wires and cables entering and exiting the components of the rack system, and to protect the wires and cables from heat and/or fire.

These and other objects are accomplished by a flame shield which redirects heat and flame away from an undersurface of a housing of electrical equipment, such as a DSX panel installed in a rack system in a wiring closet. The flame shield has a conforming shape to a lower surface of the DSX panel. The flame shield includes tabs with mounting holes, which permit the same fasteners used to initially attach the DSX panel to the rails of the rail system to be reused in attaching the flame shield and DSX panel combination to the rails of the rack system. Also, the flame shield includes an extended portion having a v-shaped cross section, which serves to shield wiring entering the DSX panel from heat and flame and also acts as a wiring guide.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 4:
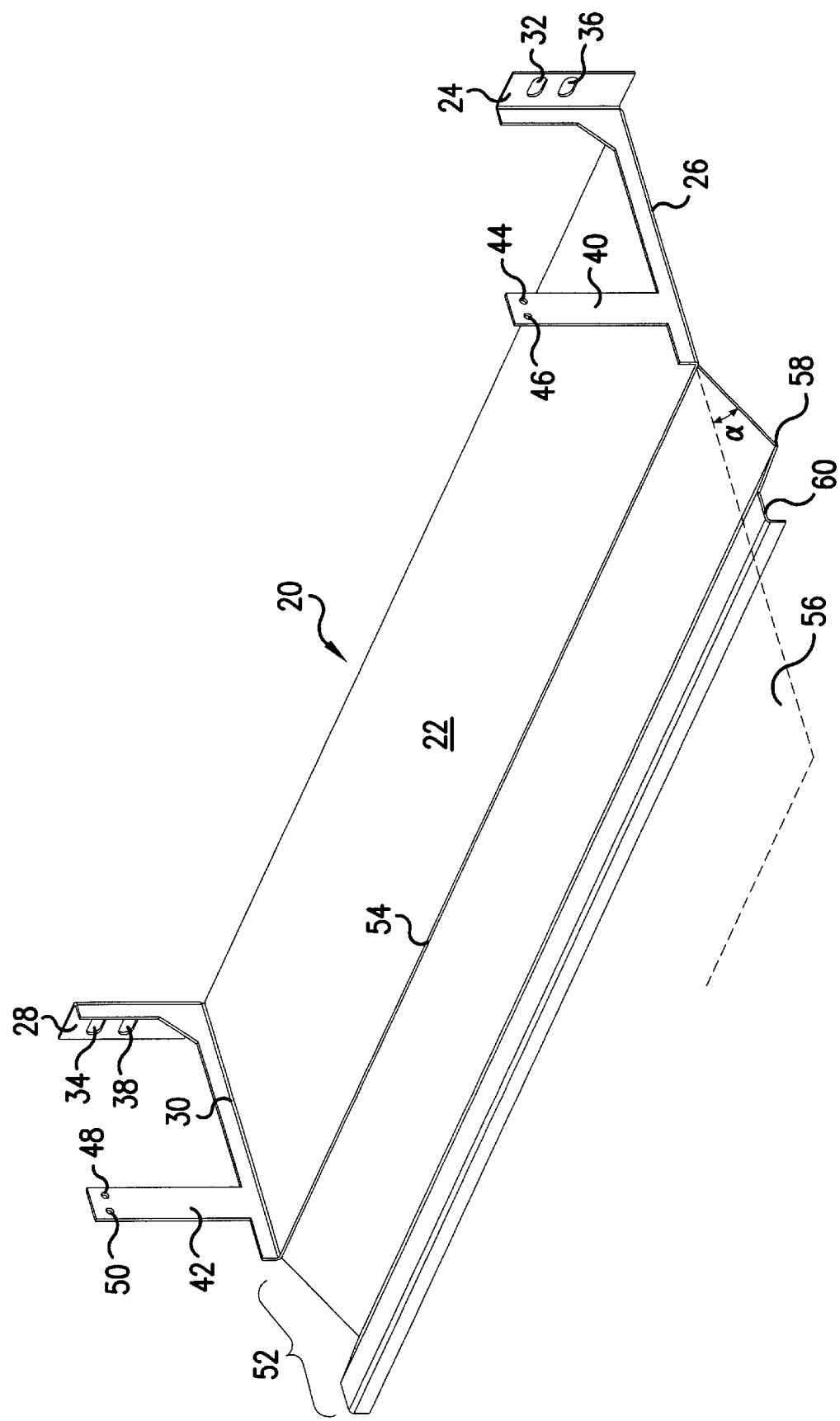
FIG. 4 is a rear perspective view of a flame shield, in accordance with the present invention.

FIG. 4 is a rear perspective view of a flame shield 20 in accordance with the present invention. The flame shield 20 includes a substantially planar portion 22 having a size approximating the bottom surface 16 of the lowermost DSX panel 5'. A first tab 24 is attached to a first side edge 26. A second tab 28 is attached to a second side edge 30, opposite the first side edge 26. The first and second tabs 24, 28 are substantially perpendicular to the planar portion 22. The first and second tabs 24, 28 include first, second, third, and fourth mounting holes 32, 34, 36, 38 extending therethrough.

A third tab 40 and a fourth tab 42 are attached to the first side edge 26 and the second side edge 30, respectively. The third and fourth tabs 40, 42 are perpendicular to the planar portion 22 and also perpendicular to the first and second tabs 24, 28. The third tab 40 includes first and second screw holes 44, 46. The fourth tab 42 includes third and fourth screw holes 48, 50.

An extended portion 52 extends outwardly away from a rear edge 54 of the planar portion 22. The extended portion 52 forms an acute angle ∝ relative to a plane 56 including the planar, portion 22, such that the extended portion 52 initially slants below the planar portion 22. The extended portion 52 includes a bend 58 such that said extended portion 52 slants back toward the plane 56 including the planar portion 22 and presents a substantially v-shape in cross section. A down turned lip 60 may also be included on the rearmost edge of the extended portion 52. The flame shield 20 may be constructed of known materials, which can function as a flame and heat shield, such as metal or ceramic.

Figure 1:
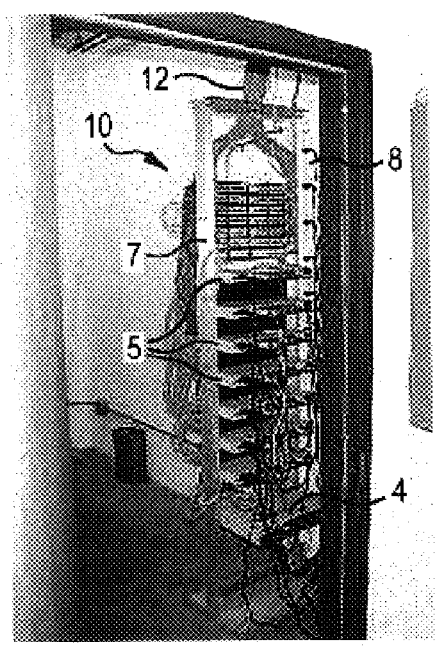
FIG. 1 is a front perspective view of a rack system in a wiring closet, in accordance with the background art.
Figure 2:
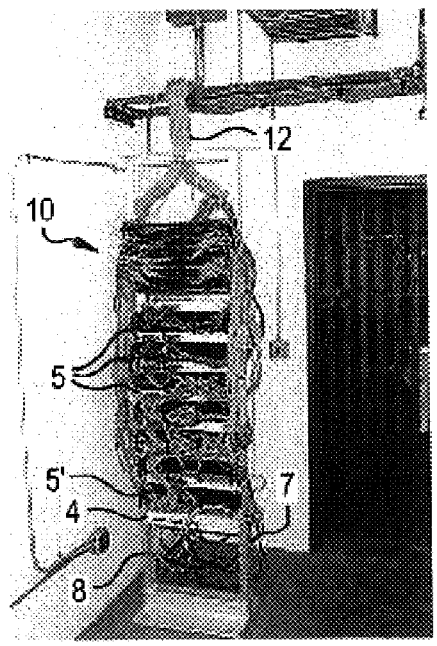
FIG. 2 is a rear perspective view of the rack system in the wiring closet, in accordance with the background art.
Figure 3:
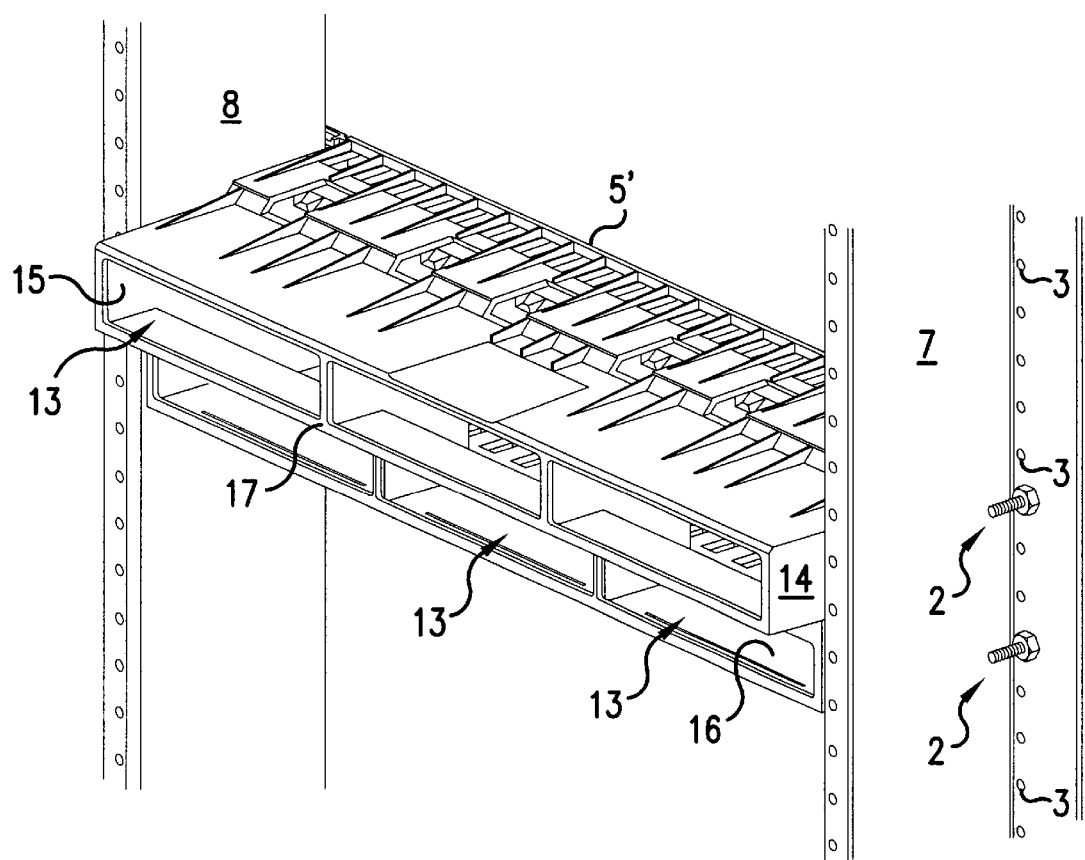
FIG. 3 is a rear close-up perspective view of a DSX panel mounted to the rack system, in accordance with the background art.
Figure 5:
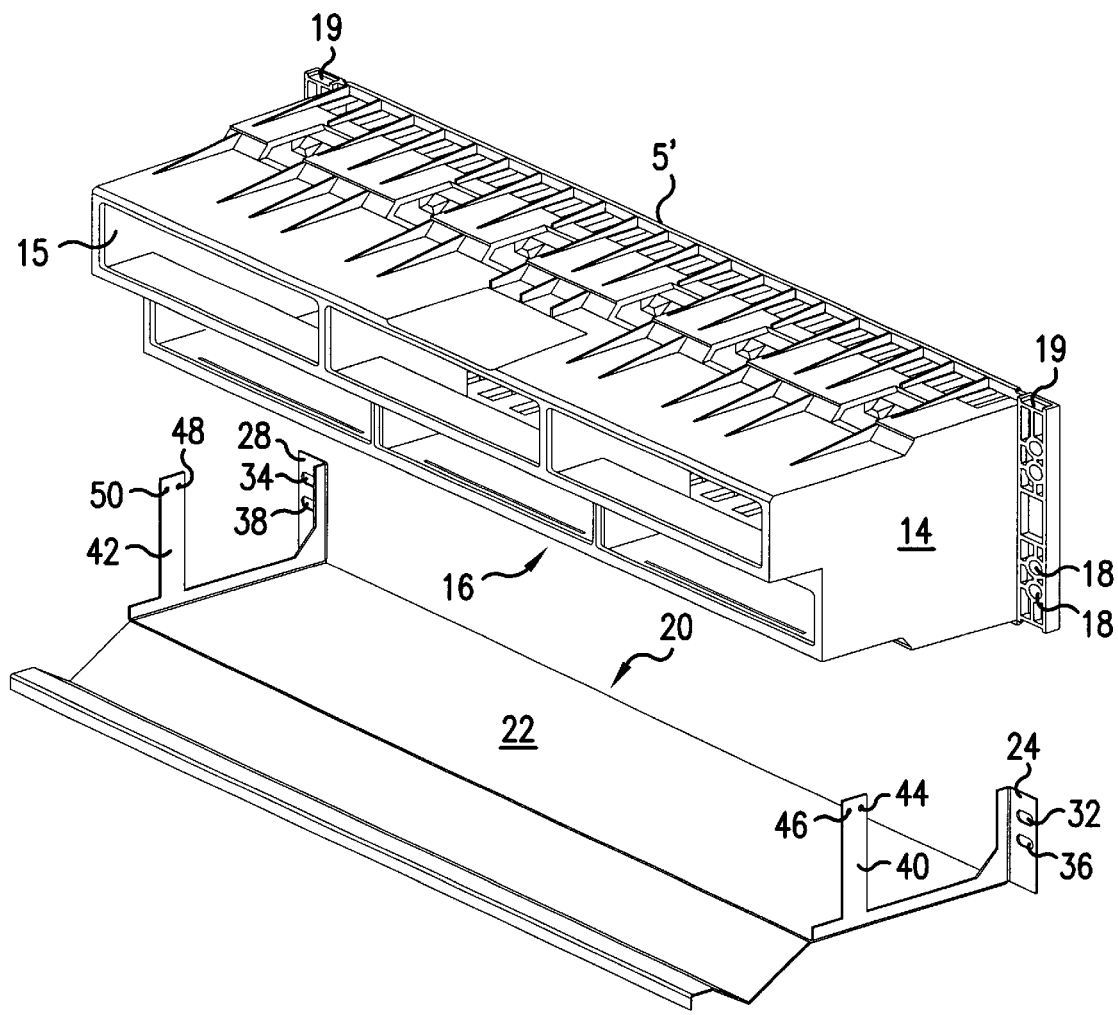
FIG. 5 is an exploded view of the flame shield of FIG. 4 and the DSX panel of FIG. 3.
Figure 6:
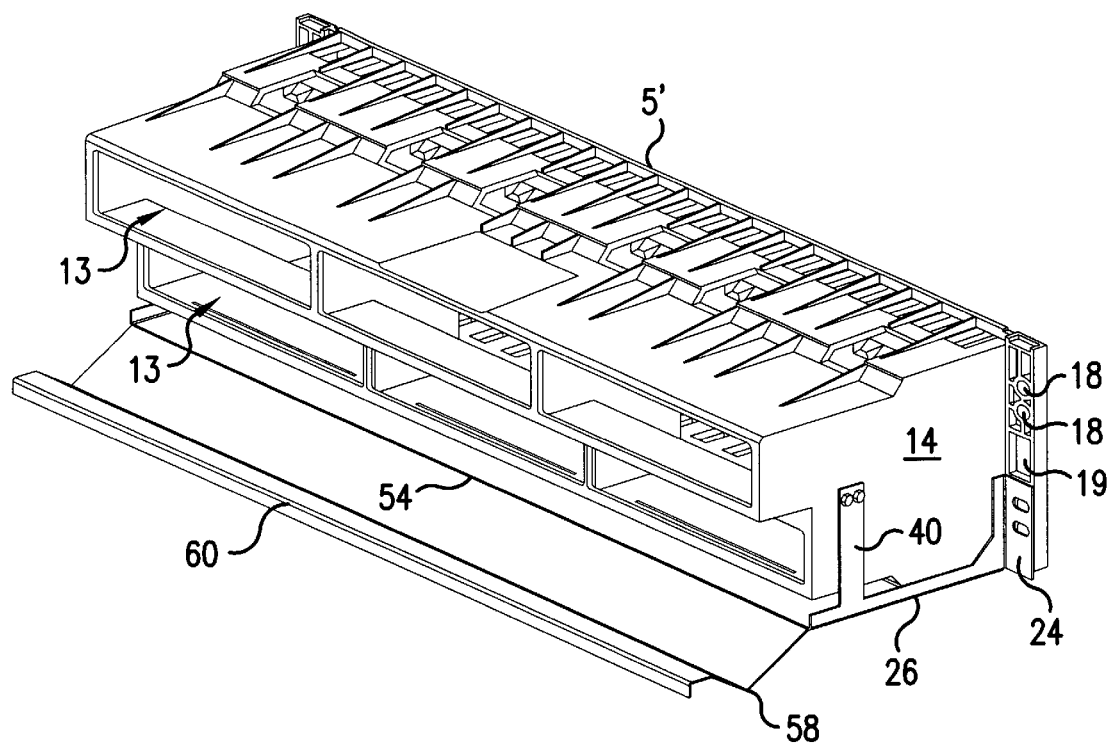
FIG. 6 is an assembled view of the flame shield of FIG. 4 and the DSX panel of FIG. 3.

FIG. 5 is an exploded rear perspective view illustrating the attachment of the flame shield 20 of FIG. 4 to the DSX panel 5' of FIG. 3. FIG. 6 is a rear perspective view of the flame shield 20 attached to the DSX panel 5'. With reference to FIGS. 5 and 6, the planar surface 22 of the flame shield 20 is brought to bear, or more preferably brought immediate adjacent to but not touching, the bottom surface 16 of the DSX panel 5'.

In this configuration, the first, second, third and fourth mounting holes 32, 34, 36, 38 of the flame shield 20 are aligned with the mounting holes 18 in the side tabs 19 of the D$X panel 5'. As a result, the same bolts or fasteners used to secure the DSX panel to the first and second rails 7, 8 can be removed and reused to secure the flame shield 20/DSX panel 5' combination to the first and second rails 7, 8. By the above arrangement, it is possible to secure the flame shield 20 to the lower surface of the DSX panel 5' without using additional fasteners.

If a more secure connection between the flame shield 20 and the DSX panel 5' is desired. It is possible to insert one or more screws or rivets through the screw holes 44, 46, 48, 50 and to engage the screws or rivets into the side walls 14, 15 of the DSX panel 5'.

In operation, the metal, or ceramic fabrication of the flame shield 20 protects the plastic DSX panel 5'from damage due to heat and/or flames coming from below the DSX panel 5'. Moreover, the extended portion 52 presents a V-shaped groove which serves to redirect heat and flame away from the building wires 12 entering the portals 13 of the DSX panel 5'. This V-shaped groove also serves the dual benefit of guiding the building wires 12, such that the building wires 12 may be better organized and have an improved appearance in the rear of the DSX panels 5.

Figure 7:
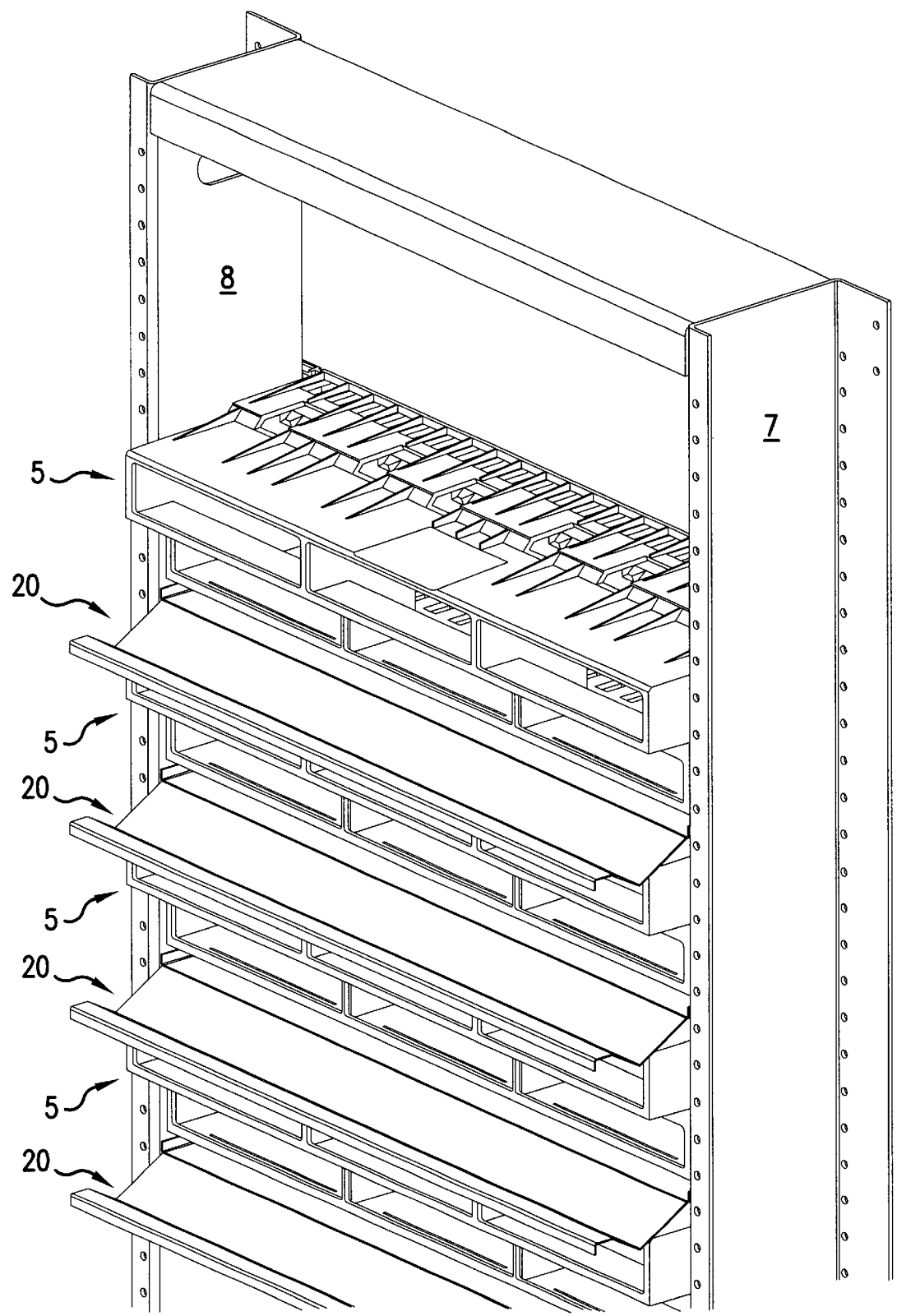
FIG. 7 is a rear perspective view of a rack system supporting several DSX panels, each with a flame shield.

Although the invention has focused on placing the flame shield 20 adjacent to the bottom surface 16 of the lowermost DSX panel 5', it should be apparent that several or all DSX panels 5 on the rack system 10 could also include a flame shield 20. FIG. 7 illustrates several DSX panels 5, each of which includes a flame shield 20, in order to organize the associating wiring and to protect the same from flame and heat. Further, although the present invention has discussed DSX panels 5 as being protected by the flame shield 20, it should be apparent that other types of electrical housings could be protected by the flame shield 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A combination comprising:
    a rack system having a first rail and a second rail;
    a housing containing electronic equipment attached to said first and second rails; and
    a flame shield attached to said housing, wherein said flame shield at least partially covers a lower side of said housing, wherein said flame shield includes an extended surface portion, which extends outwardly away from an edge of said housing and wherein said edge of said housing is defined by the junction of a rear surface and a bottom surface of said housing.

2. The combination according to claim 1, wherein said flame shield completely covers said lower side of said housing.

3. The combination according to claim 2, wherein said flame shield abuts said lower side of said housing.

4. The combination according to claim 1, further comprising:
    a power supply attached to said first and second rails, wherein said power supply is located below said flame shield on said rack system.

5. The combination according to claim 1, wherein said extended surface portion defines an upwardly opening cable guide.

6. The combination according to claim 5, wherein said upwardly opening cable guide is v-shaped.

7. The combination according to claim 1, wherein said housing is a plastic digital cross connection (DSX) panel and said right and left rails are substantially parallel.

8. The combination according to claim 1, wherein said flame shield is formed of metal.

9. The combination according to claim 1, wherein said housing is attached to said rack system by bolts or screws.

10. The combination according to claim 9, wherein said bolts or screws also attach said flame shield to said rack system.

11. The combination according to claim 1, wherein said flame shield includes a substantially rectangular planar portion, a first tab extending substantially perpendicular to said planar portion with a first mounting feature, a second tab extending substantially perpendicular to said planar portion with a second mounting feature, wherein said flame shield is sized and shaped to be conformable to a lower surface of said housing containing electronic equipment, such that said first and second mounting features cooperate with mounting features of said housing containing electronic equipment for attaching said housing containing electronic equipment to said rack system.

12. A combination comprising:
    a flame shield including a substantially rectangular planar portion, a first tab extending substantially perpendicular to said planar portion with a first mounting hole extending therethrough, a second tab extending substantially perpendicular to said planar portion with a second mounting hole extending therethrough, wherein said flame shield is sized and shaped to be conformable to a lower surface of a digital cross connect (DSX)

panel, such that said first and second mounting holes align with mounting holes formed on the DSX panel for attaching the DSX panel to a rack system.

13. The combination according to claim 12, wherein said flame shield is formed of metal.

14. The combination according to claim 12, wherein said first tab further includes a third mounting hole extending therethrough and said second tab further includes a fourth mounting hole extending therethough, such that said first, second, third and fourth mounting holes align with mounting holes formed on the DSX panel for attaching the DSX panel to the rack system.

15. The combination according to claim 12, wherein said first tab extends from a first side edge of said planar portion and said second tab extends from a second opposite side edge of said planar portion, and wherein said flame shield further includes an extended surface portion, which extends outwardly away from a rear edge of said planar portion, said extended surface portion forming an acute angle relative to a plane including said planar portion, such that said extended portion slants below said planar portion.

16. The combination according to claim 15, wherein said extended portion includes a bend such that said extended portion slants back toward said plane including said planar portion and presents a substantially v-shape in cross section.

17. The combination according to claim 15, wherein said flame shield further includes a third tab extending substantially perpendicular to said planar portion and attached to said first side edge with a first screw hole extending therethrough, and a fourth tab extending substantially perpendicular to said planar portion and attached to said second side edge with a second screw hole extending therethough, such that a first and second screw may be inserted through said first and second screw holes to attached said flame shield to the DSX panel.

18. A combination comprising:

a rack system having a first rail and a second rail;

a housing containing electronic equipment attached to said first and second rails; and a flame shield attached to said housing, wherein said flame shield at least partially covers a lower side of said housing, wherein said housing is a digital cross connect (DSX) panel and wherein said flame shield includes a substantially rectangular planar portion, a first tab extending substantially perpendicular to said planar portion with a first mounting hole extending therethrough, a second tab extending substantially perpendicular to said planar portion with a second mounting hole extending therethough, wherein said flame shield is sized and shaped to be conformable to a lower surface of said DSX panel, such that said first and second mounting holes align with mounting holes formed on the DSX panel for attaching said DSX panel to said rack system.

19. The combination according to claim 18, wherein said DSX panel is attached to said rack system by bolts or screws, and wherein said bolts or screws also attach said flame shield to said rack system.

20. The combination according to claim 18, wherein said flame shield is formed of metal.

\* \* \* \* \*